United States Patent [19]

Quates, Sr et al.

[11] Patent Number: 4,511,291

[45] Date of Patent: Apr. 16, 1985

[54] VACUUM MATERIAL CONVEYING APPARATUS

[76] Inventors: Norman C. Quates, Sr, P.O. Box 896, Harvey, La. 70059; Norman C. Quates, Jr., 1716 Orchid, Harvey, La. 70058

[21] Appl. No.: 384,629

[22] Filed: Jun. 3, 1982

[51] Int. Cl.³ ............................................ B65G 53/14
[52] U.S. Cl. .................... 406/128; 406/153; 406/168
[58] Field of Search ............ 406/109, 144, 128, 168, 406/175, 153, 171–173; 222/510, 548, 557, 512

[56] References Cited

U.S. PATENT DOCUMENTS

| | | | |
|---|---|---|---|
| 1,585,549 | 5/1926 | Jorgensen | 406/128 X |
| 2,956,838 | 10/1960 | Thoresen | 406/172 X |
| 3,102,665 | 9/1963 | Zeiss | 222/512 X |
| 3,169,038 | 2/1965 | Pendleton | 406/172 |
| 3,186,769 | 6/1965 | Howlett, Jr. | 406/153 |
| 3,305,139 | 2/1967 | Ward | 222/557 X |
| 3,498,003 | 3/1970 | Hulbert, Jr. | 406/109 X |
| 3,625,571 | 12/1971 | Kimm | 406/127 |
| 3,737,074 | 6/1973 | Davies | 406/171 |
| 3,861,830 | 1/1975 | Johnson | 406/109 X |

Primary Examiner—Jeffrey V. Nase
Assistant Examiner—L. E. Williams
Attorney, Agent, or Firm—Keaty & Keaty

[57] ABSTRACT

An adaptor is disclosed for conveying fluidizable material to a pressurizer tank provided with a removable lid which selectively seals the tank. The adaptor comprises a lid for replacing the removable lid, a venturi mounted on the adaptor, a pipe for introducing fluid into an open end of the venturi to create at least a partial vacuum inside the tank, and a delivery conduit in fluid communicating relationship with the interior of the tank through which fluidized material such as sand is delivered to the tank as a result of the vacuum created in the tank by the venturi. The delivery conduit is provided with an opening through one of its side walls through which fluidizable material enters the delivery conduit, while a flow of pressurized air is introduced into the delivery conduit through an open end to at least partially fluidize the fluidizable material as it enters the delivery conduit. A hopper is also provided for holding the fluidizable material in fluid delivering relationship to the aperture in the delivery conduit. This structure provides an apparatus for adapting existing pressurizer tanks to receive fluidizable material such as sand.

1 Claim, 8 Drawing Figures

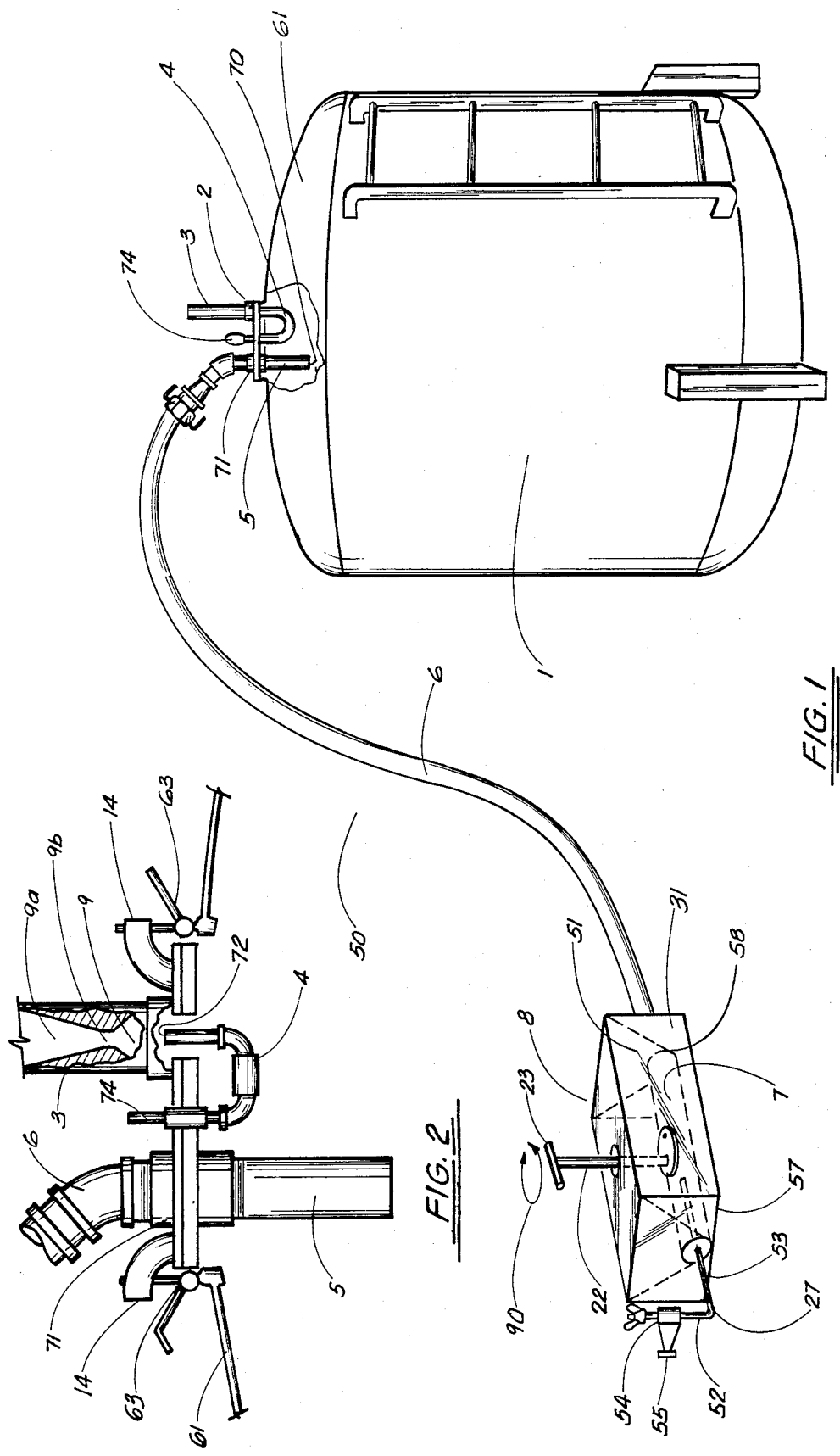

VACUUM MATERIAL CONVEYING APPARATUS

BACKGROUND OF THE INVENTION

1. Field of the Invention

The present invention relates to an apparatus for filling a closed container with fluidized material, and in particular, to a system for delivering fluidized sand to a sand blasting machine bulk pressurizer tank, wherein the primary function of the apparatus is to create at least a substantial vacuum in the tank prior to delivery of the fluidized sand, thereby facilitating the loading of the material into the tank.

2. General Background

The present invention teaches an apparatus for loading a material-holding container with fluidizable material, the apparatus comprising means for introducing fluidized material into the container, a venturi which communicates with the interior of the container on one end and communicates with the atmosphere on the other end, and a passageway for introducing pressurized fluid into the venturi for creating at least a substantial vacuum in the container, thereby enabling the container to be filled with the material. The present, although not exclusive, application of the present invention is for filling a sand blasting machine bulk pressurizer unit tank with fluidized sand, for use in said blast cleaning of tanks, barges, silos, shops yards, and other purposes.

In the preferred embodiment, the present invention comprises a vacuum adaptor lid which is readily substitutable for the standard hatch provided on sand blastig tanks and many other types of containers. The vacuum adaptor fits the existing opening on the standard bulk blasting machine and is secured using existing camlock lever bolts which removably secure the hatch to the tank.

The present invention is a novel apparatus in the sand blasting industry, although it is easily foreseeable that the present invention will have widespread application in virtually any industry in which it is desired to load a closed container with any material in a manner so as to optimally fill the container at minimal cost. The present invention is readily substitutable for the hatch of the container. The standard presently existing method of filling containers with material, and especially for filling sand blasting machine bulk pressurizer units with sand, is to pump the sand through a material hose into the tank with a standard positive displacement pump disposed adjacent to the container, the costs of these pumps varying from $10,000 to $20,000. The present invention would be much less expensive, and much easier to implement.

Other objects and advantages of the present invention will become readily apparent to those skilled in the art from reading the following description in conjunction with the accompanying drawings.

BRIEF DESCRIPTION OF THE DRAWINGS

FIG. 1 is an elevated, frontal view of the apparatus of the present invention, partially in cross-section.

FIG. 2 is an elevated, partially cross-sectional view of the adaptor lid of the present invention.

DETAILED DESCRIPTION OF THE PREFERRED EMBODIMENT

Figure 3:
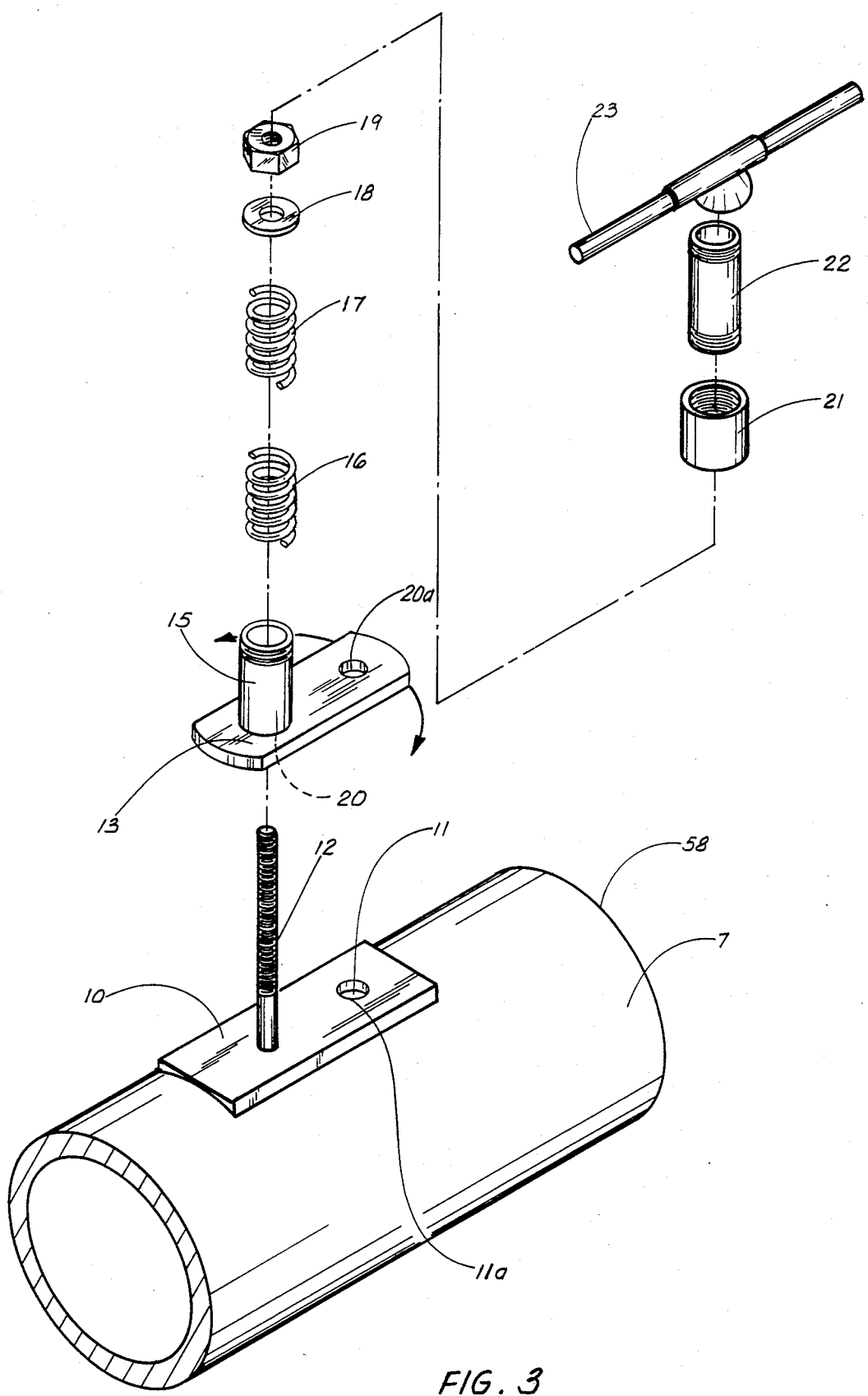
FIG. 3 is a blow-up, piece-by-piece elevational view of the metering device without the hopper and the stationary plate.
Figure 4:
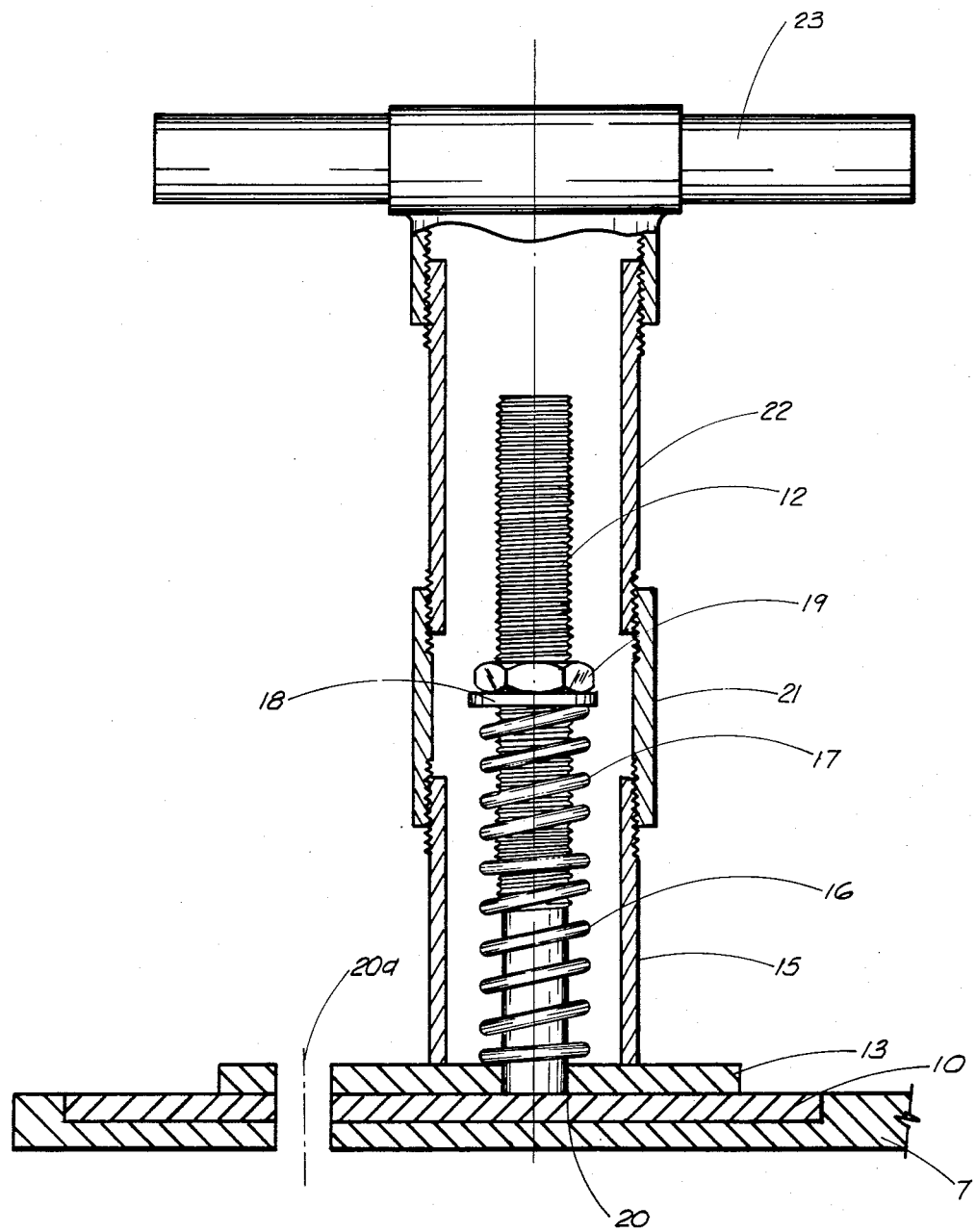
FIG. 4 is a cross-sectional, elevational view of the metering device and the stationary plate fixably attached to the top of the third section of the conduit.
Figure 7:
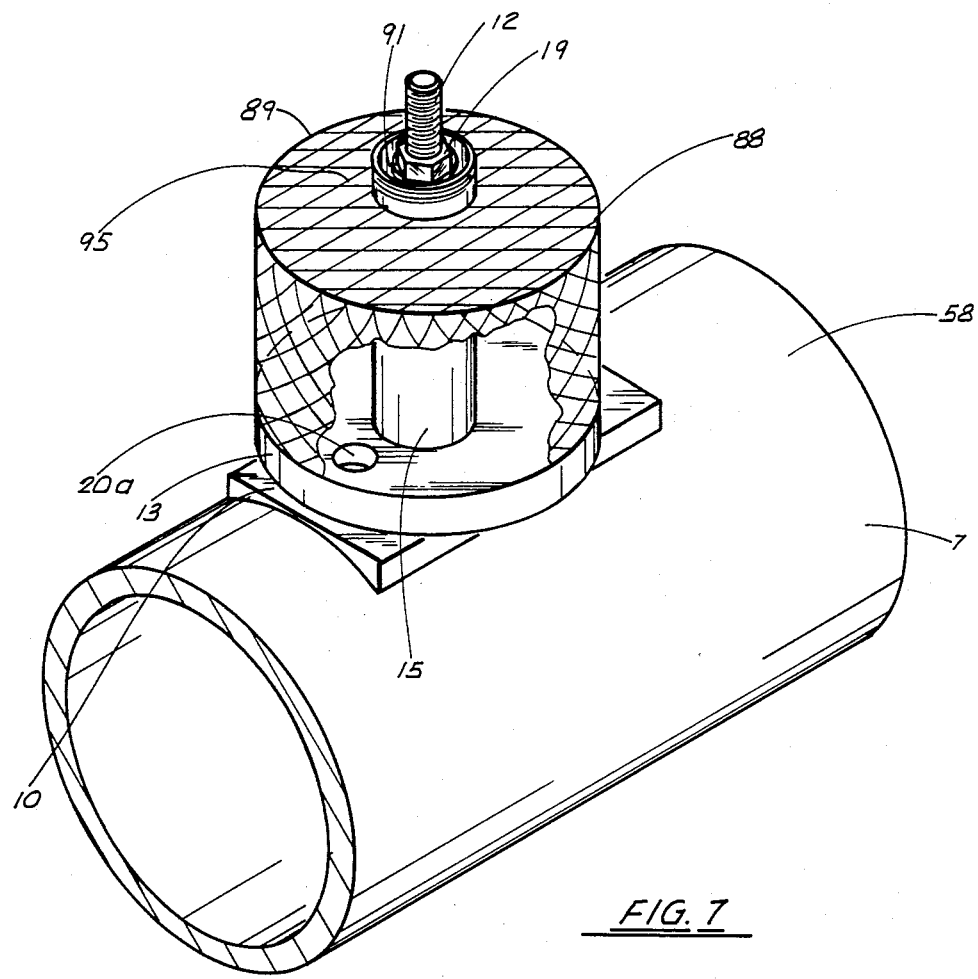
FIG. 7 is a perspective view of the grated enclosure mounted on the flow regulating plate rotatably disposed with the stationary plate mounted to the third section of the conduit.

Referring now to FIG. 1, there can be seen a sand-blasting machine bulk pressurizer tank 1, the present invention being therein shown connected thereto. The present invention, in one of its aspects, comprises a metering device, indicated generally by the numeral 8, mounted in material delivering relationship to the first section 5 of a conduit, indicated generally by the numeral 50. As best seen in FIG. 4, metering device 8 comprises a generally cylindrical collar 15 having a flow regulating plate 13 fixably attached, for example, welded, to the bottom thereof, plate 13 having a substantially centrally located first aperture 20 and a substantially radially located second aperture 20a, collar 15 being provided with external machined-threads on its upper portion for mating with internally provided machined-threads on the lower portion of a sleeve 21, sleeve 21 being provided with internal machined-threads at its upper portion for mating with machined-threads provided at the lower portion of a connector collar 22, connector collar 22 being provided with external machined-threads at its upper portion for mating with a handle bar 23, handle bar 23 and connector collar 22 thereby forming a T. Metering device 8 further comprises a hopper 31 which holds the sand (not shown) which it is the primary object of the present invention to load into the sand-blasting tank 1. As best seen in FIG. 1, hopper 31 is a generally rectangular box having a V-shaped trough 51 therein for holding the sand (not shown) to be delivered into sand-blasting tank 1. A stationary plate 10 having an orifice 11 as best seen in FIG. 4, is fixably mounted, for example, welded to the top surface of the third section 7 of conduit 50, third section 7 comprising an elongate flexible tubular member, generally maybe of steel, although this is not the exclusive embodiment. Flow regulating plate 13 is rotatably mounted thereon, radial aperture 20a of flow regulating plate 13 being selectively alignable with orifice 11 of stationary plate 10. Referring now to FIG. 7, a generally cylindrical, grated enclosure 88, is fixably mounted to flow regulating plate 13 so as to rise upwardly therefrom, the top surface 89 of grated enclosure 88 having a substantially centrally located aperture 91; grated enclosure 88 is an optional feature of the present invention for receiving sand from bags (not shown) which would be breakable on the grating 95 of enclosure 88. A threaded shaft 12 is fixably attached to, for example, welded, to stationary plate 10 so as to rise upwardly therefrom through the central aperture 20 of flow regulating plate 13 and aperture 91 of enclosure 88. A pair of helical power coil springs 16, 17 are circumferentially mounted to shaft 12, spring 16 communicating with plate 13 for biasing flow regulating plate 13 downwardly against stationary plate 10, by means of tightening a washer 18 and a nut 19 on shaft 12, thereby forming a fluid seal between flow regulating plate 13 and stationary plate 10, thereby preventing the escape of sand from hopper 31 therebetween. Generally L-shaped pipe 27, having a vertical section 52 and a horizontal section 53, is coupled on the end of the vertical section 52 to an air compressor (not shown) and coupled on the end of horizontal section 53 to the third section 7 of conduit 50. A ball valve 54 is provided in vertical section 52 in series with an air pressure gauge 55 located just below ball valve 54. The end of horizontal section 53 of L-shaped pipe 27 is crimped (not shown) 56 for mating with a straight pipe 57, straight pipe 57 extending inwardly into third section 7 of conduit 50 approximately ⅔ beyond the origination point 11a of orifice 11 of stationary plate 10, for reasons which will hereinafter be seen. Conduit 50 comprises a second section 6, second section 6 comprising a flexible, fluid flow hose 6 having a first end coupled to the end 58 of the third section 7 of conduit 50 opposite L-shaped pipe 27, second section 6 having a second end coupled to the first section 5 of conduit 50. First section 5 of conduit 50 comprises an elongated, inflexible tubular member, generally made of steel, although this is not the exclusive embodiment.

Figure 5:
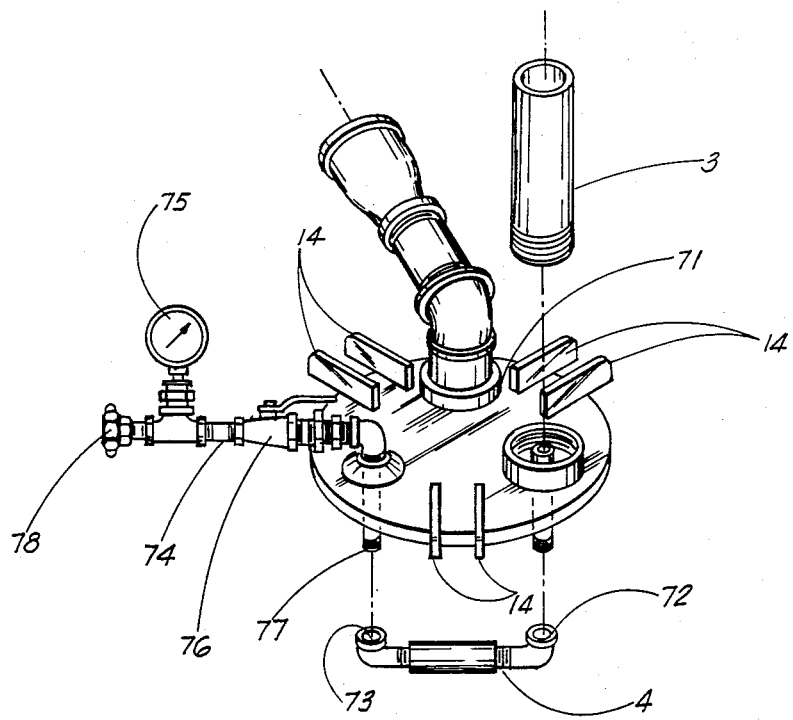
FIG. 5 is a perspective view of the adaptor vacuum lid, with the venturi and the U-shaped tubular member shown disassembled.
Figure 6:
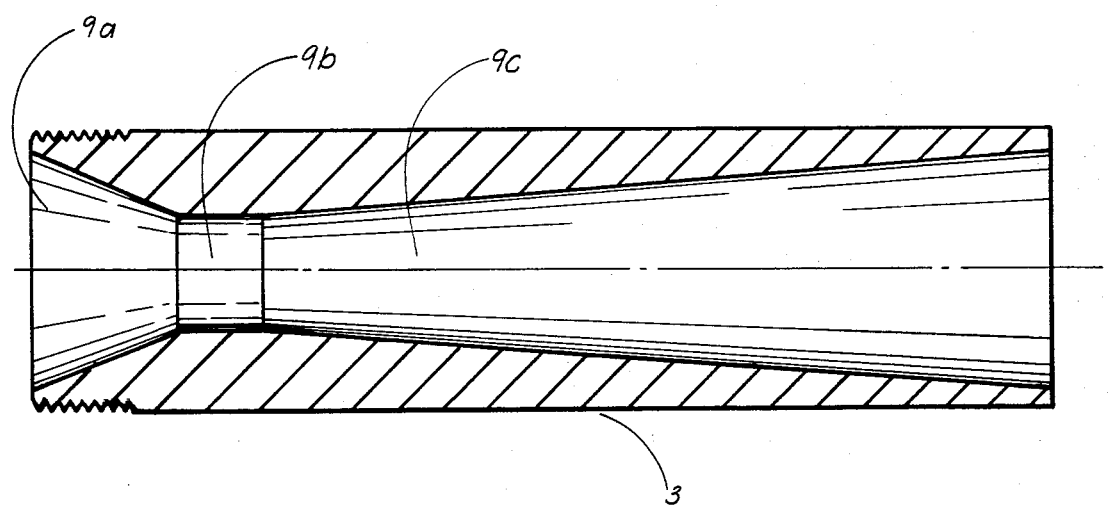
FIG. 6 is a cross-sectional, elevational view of the venturi.
Figure 8:
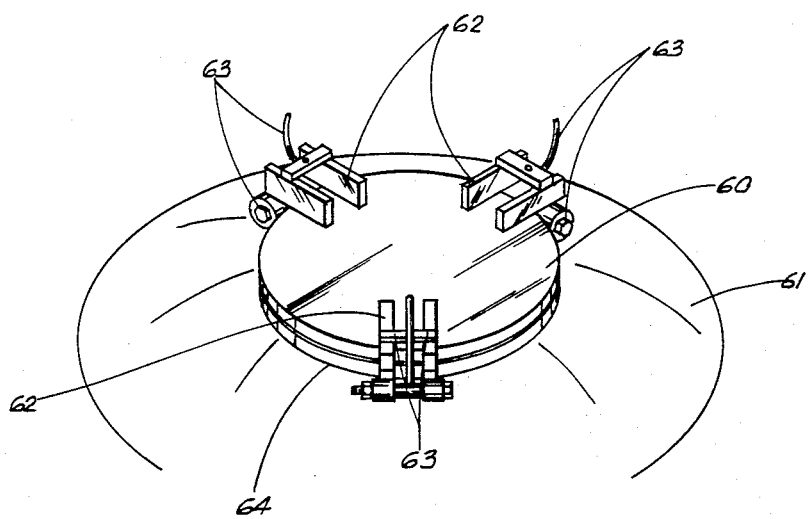
FIG. 8 is a perspective view of the top of a conventional sand blasting tank having a standard camlock lever bolt action hatch.

Referring now to FIG. 8, many sand-blasting tanks presently in existence and widely used in industry are provided with a hatch 60 on their top surface 61. These hatches 60 generally are provided with a plurality (here, three) of prongs 62 integral therewith and extending outwardly from the circumference thereof. Standard camlock lever bolts 63 are provided around the port 64 for releasable engagement with prongs 62 of hatch 60. By pulling downwardly on lever bolt 63, hatch 60 of the sand blasting tank can be hingedly removed from prongs 62. Another major aspect of the present invention is an adaptable vacuum-creating lid, indicated generally by the numeral 2 in FIG. 1, therein shown substituting for hatch 60 on top surface 61 of sand-blasting tank 1. Adaptable lid 2, or adaptor lid 2 as best seen in FIG. 5, is provided with a plurality of prongs 14 integral therewith and extending outwardly from the circumference thereof, for engaging the camlock lever bolts 63 provided on the tank 1, thereby substituting for hatch 60. A venturi 3, as seen in isolation in FIG. 6, has a first flared end 9a communicating with the interior of tank 1 and integral to adapatable lid 2 and a second flared end 9c communicating with the atmosphere, venturi 3 having a constricted middle 9b connecting flared end 9 with flared end 9a. The first section 5 of conduit 50 comprises an elongated, inflexible pipe generally made of steel, first section 5 having a first end 70 extending downwardly into the interior of tank 1, first end 70 extending downwardly beyond flared end 9 of venturi 3 for preventing introduction of the sand being delivered therethrough into venturi 3, and a second end 71 integral with adaptable lid 2, second end 71 being coupled to second section 6 of conduit 50. A generally U-shaped tubular member 4 having a first end 72 disposed partially into flared end 9 of venturi 3, thereby fluidly communicating with flared end 9 of venturi 3, and a second end 73 integral with adaptable lid 2, second end 73 coupled to one end 77 of an air compressor pipe 74, is best seen in FIG. 5. Air compressor pipe 74 comprises an air pressure gauge 75 and a ball valve 76, ball valve 76 being disposed closer to second end 73 of tubular member 4. Air compressor pipe 74 is coupled on its other end 78 to an air compressor (not shown).

The method of operation of the apparatus of the present invention is as follows:

1. Camlock lever bolts 63 provided on tank 1 are pulled downwardly, thereby releasing hatch 60 from engagement with tank 1, hatch 60 then being pulled back so as to expose port 64 of tank 1;
2. Prongs 14 of adaptable lid 2 are engaged with camlock lever bolts 63 of tank 1, camlock lever bolts 63 being pulled upwardly to secure adaptable lid 2 thereto, thereby substituting adaptable lid 2 for hatcch 60;
3. The air compressor (not shown) coupled to air compressor pipe 74 is actuated, thereby introducing compressed air through air compressor pipe 74 and through tubular member 4 into flared end 9 of venturi 3, the compressed air then travelling through constricted middle 9b of and flared end 9a of venturi 3, thereby creating at least a substantial vacuum in tank 1; ball valve 76 is adjusted, in the preferred embodiment, to allow 90 p.s.i. of compressed air through air compressor pipe 74, as can be detected on air pressure gauge 75;
4. The air compressor coupled to the end of vertical section 52 of L-shaped pipe 27 is actuated, thereby introducing compressed air through vertical section 52 and horizontal section 53 of L-shaped pipe 27 and through straight pipe 57 into the third section 7 of conduit 50; in the preferred embodiment, ball valve 54 is adjusted so as to allow 3 to 5 p.s.i. of compressed air to flow through said L-shaped pipe 27 and into the third section 7 of conduit 50; in the preferred embodiment, ball valve 54 is adjusted so as to allow 3 to 5 p.s.i. of compressed air to flow through L-shaped pipe 27 and into the third section 7 of conduit 50;
5. Handle bar 23 of metering device 8 is turned in the direction of directional arrow 90 in FIG. 1, so as to align radial aperture 20a of flow regulating plate 13 with orifice 11 of stationary plate 10, as can best be seen in FIG. 4, thereby causing the sand (not shown) to be delivered from V-shaped trough 51 of hopper 31 through radial aperature 20a of flow regulating plate 13 and orifice 11 of stationary plate 10 into the third section 7 of conduit 50; the degree of rotation of handle bar 23 determines the extent of alignment between aperture 20a of flow regulating plate 13 and orifice 11 of stationary plate 10, the more perfect the alignment, the greater the amount of sand which is delivered into third section 7 of conduit 50, and the operator's experience, will determine the proper setting;
6. The 3 to 5 p.s.i. of compressed air delivered from the air compressor (not shown) coupled to L-shaped pipe 27 through L-shaped pipe 27 and straight pipe 57 into third section 7 of conduit 50 approximately ⅔ beyond the orignation point 11a of orifice 11 of stationary plate 10, fluidizes the sand being delivered into the third section 7 of conduit 50 from hopper 31, and propels the sand through second section 6 of conduit 50 and through the first section 5 of conduit 50 and into the interior of tank 1, the vacuum created in step 3. above, thereby allowing the sand to fill the tank 1;
7. Note that the crimped end (not shown) of L-shaped pipe 27 prevents the air pressure of the compressed air being delivered by the air compressor (not shown) coupled to L-shaped pipe 27 from diminishing prior to entry into the third section 7 of conduit 50; also note that the positioning of straight pipe 27 approximately ⅔ beyond the origination point 11a of orifice 11 of stationary plate 10 prevents the sand being delivered from hopper 31 into the third section 7 of conduit 50 from coagulating in the third section 7 of conduit 50 and from being injected through the orifice 11 stationary plate 10, thereby ensuring sufficient fluidization of the sand so that it can be propelled by the compressed air through the third section 6 of conduit 50, through the second section 6 of conduit 50, and through the first section 5 of conduit 50 and into the tank 1 for filling the tank 1.

The foregoing description of the invention is explanatory and illustrative only, and changes in the details of the construction illustrated may be made by those skilled in the art, without departing from the spirit of the invention.

What is claimed as invention is:

1. An adaptor for conveying fluidizable material to a pressurizer tank provided with a removable lid which selectively at least partially seals said tank, said adaptor comprising:

an adaptor lid configured to replace said removable lid for selectively at least partially sealing said tank;

a venturi mounted on said adaptor lid and having first and second flared ends, the first end thereof being in fluid communicating relationship with the interior of said tank through a venturi opening in the adaptor lid, the second end of said venturi being in fluid communicating relationship with the atmosphere;

a generally U-shaped pipe having a first end and a second end, the first end thereof being disposed in the interior said tank adjacent the first end of said venturi for directing a stream of pressurized fluid thereinto, the second end of said U-shaped pipe being in fluid communicating relationship with a source of pressurized fluid through a pressure introduction aperture in the adaptor lid;

a delivery conduit having a first end in fluid communicating relationship with the interior of said tank through a delivery aperture in the adaptor lid, and a second end through which said materials are introduced, the first end of said conduit being provided with a projection for conveying the fluidized material to a distance into said tank beyond said venturi opening in the adaptor lid to prevent fluidized material from being introduced into said venturi;

an aperture through said delivery conduit adjacent its second end through which said fluidizable material enters said delivery conduit;

a pipe inserted into said delivery conduit for delivering a flow of pressurized fluid to the interior of said delivery conduit adjacent said aperture to at least partially fluidize said fluidizable material as it enters said delivery conduit through said aperture in said delivery conduit;

a hopper for holding said fluidizable material in fluid delivering relationship to said aperture through said delivery conduit;

a first flat stationary plate disposed on the outside of said conduit, said plate being provided with an apperture alignable with the aperture in said conduit;

a second flat plate rotatably mounted on top of said first plate, said second plate being provided with an aperture alignable with the aperture in said first plate, the degree of alignment between the apertures in said first and second plates being variable by rotation of said second plate;

a plurality of camlock lever bolts secured to the tank and adapted for attachment to prongs on said adaptor lid for selectively securing said adaptor lid to said tank.

* * * * *